(12) United States Patent
Wang

(10) Patent No.: US 10,574,133 B2
(45) Date of Patent: Feb. 25, 2020

(54) SNUBBER CIRCUIT AND DISPLAY APPARATUS USING SAME

(71) Applicants: HKC Corporation Limited, Shenzhen, Guangdong (CN); Chongqing HKC Optoelectronics Technology Co., Limited, Chongqing (CN)

(72) Inventor: Mingliang Wang, Chongqing (CN)

(73) Assignees: HKC Corporation Limited, Shenzhen, Guangdong (CN); Chongqing HKC Optoelectronics Technology Co., Limited, Chongqing (CN)

( * ) Notice: Subject to any disclaimer, the term of this patent is extended or adjusted under 35 U.S.C. 154(b) by 155 days.

(21) Appl. No.: 15/735,249

(22) PCT Filed: Sep. 4, 2017

(86) PCT No.: PCT/CN2017/100328
§ 371 (c)(1),
(2) Date: Dec. 11, 2017

(87) PCT Pub. No.: WO2019/037151
PCT Pub. Date: Feb. 28, 2019

(65) Prior Publication Data
US 2019/0267891 A1  Aug. 29, 2019

(30) Foreign Application Priority Data
Aug. 25, 2017 (CN) .......................... 2017 1 0742987

(51) Int. Cl.
*H02M 1/34* (2007.01)
*G09G 3/36* (2006.01)
(Continued)

(52) U.S. Cl.
CPC ................ *H02M 1/34* (2013.01); *G09G 3/20* (2013.01); *G09G 3/36* (2013.01); *H02M 1/44* (2013.01); *H02M 2001/346* (2013.01)

(58) Field of Classification Search
CPC .... H02M 1/32; H02M 1/34; H02M 2001/342; H02M 2001/344; H02M 2001/346;
(Continued)

(56) References Cited

U.S. PATENT DOCUMENTS 4,267,966 A * 5/1981 Neel ........................ F23N 5/203
165/205
4,678,957 A * 7/1987 Harnden, Jr. .......... H01H 57/00
200/181
(Continued)

FOREIGN PATENT DOCUMENTS

CN  101587876 A  11/2009
CN  102842292 A  12/2012
(Continued)

OTHER PUBLICATIONS

International Search Report dated May 23, 2018, in the corresponding PCT application PCT/CN2017/100328,11 pages in Chinese, 3 pages in English.

*Primary Examiner* — Adolf D Berhane
(74) *Attorney, Agent, or Firm* — Juan Carlos A. Marquez; Marquez IP Law Office, PLLC

(57) ABSTRACT

This application relates to a snubber circuit and a display apparatus using same. The snubber circuit is disposed on a circuit board of a display panel, and includes: a resistor unit, where two ends of the resistor unit are in a shape of being wide outside and being narrow inside in an inward direction, and a first end of the resistor unit is electrically coupled to an input signal; and a capacitor unit, including a first charge plate and a second charge plate disposed opposite to each other, where the first charge plate is electrically coupled to a second end of the resistor unit, and the second charge plate is electrically coupled to a grounding line, where the resistor unit and the capacitor unit are formed on the circuit, board in a manner of conductive line configuration.

14 Claims, 7 Drawing Sheets

(51) Int. Cl.
*H02M 1/44* (2007.01)
*G09G 3/20* (2006.01)

(58) Field of Classification Search
CPC .... H02M 2001/348; H02M 1/42; H02M 1/44; G09G 3/36
See application file for complete search history.

(56) References Cited

U.S. PATENT DOCUMENTS

| | | | | |
|---|---|---|---|---|
| 5,512,804 | A * | 4/1996 | Yamamoto | H04N 3/26 315/382.1 |
| 6,070,787 | A * | 6/2000 | Harada | H01L 21/00 228/164 |
| 7,999,652 | B2 * | 8/2011 | Harada | H01C 3/12 338/195 |
| 2006/0028147 | A1 * | 2/2006 | Shinmen | H05B 41/2827 315/209 R |
| 2009/0147433 | A1 * | 9/2009 | Gabara | H05F 3/00 361/233 |
| 2019/0311864 | A1 * | 10/2019 | Wu | H01H 50/54 |
| 2019/0312522 | A1 * | 10/2019 | Li | H02M 7/003 |
| 2019/0327804 | A1 * | 10/2019 | Zhou | H05B 33/089 |

FOREIGN PATENT DOCUMENTS

| | | |
|---|---|---|
| CN | 105096862 A | 11/2015 |
| CN | 106655752 A | 5/2017 |
| CN | 106953511 A | 7/2017 |
| JP | 2006196803 A | 7/2006 |

\* cited by examiner

SNUBBER CIRCUIT AND DISPLAY APPARATUS USING SAME

BACKGROUND

Technical Field

This application relates to a field of display technologies, and in particular, to a snubber circuit and a display apparatus using the same.

Related Art

Currently, with the requirement for the high power supply efficiency, power switching circuits have been spread around. To provide effective power supply control and use, power supply circuits with different specific functions are generated, such as a step-up circuit a step-down circuit, and other circuits with specific functions formed by power management ICs and peripheral circuits.

Because a power switching circuit is always switched "on" and "off" frequently, signal waveforms oscillate regardless of on or off before being gradually stable. The power switching circuit is controlled to frequently switch between "on" and "off" due to the intrinsic property of the power switching circuit. Consequently, such an oscillation signal is constantly generated, and is finally radiated out by air. Therefore, the electromagnetic interference (EMI) brought by the oscillation signal is relatively severe.

Currently, a common improving method is to dispose, in a power supply circuit, a snubber circuit for reducing the EMI. The snubber circuit includes a resistor component and a capacitor component. Such an oscillation signal may be quickly, eliminated by means of the damping effect of the resistor component and the capacitor component, to maintain stable signal waveforms, thereby greatly reducing the EMI. However, the disposition of the resistor component and the capacitor component increases costs of part materials and circuit processing, and is greatly affected in the field of low-cost applications.

SUMMARY

To resolve the foregoing technical problem, an objective of this application is to provide a snubber circuit and a display apparatus using the same. The snubber circuit is formed in a wiring manner, so as to reduce manufacturing costs while maintaining a circuit effect.

The objective of this application is achieved and the technical problem of this application is resolved by using the following technical solutions. A snubber circuit in this application is disposed on a circuit board of a display apparatus, and comprises: a resistor unit, wherein two ends of the resistor unit are in a shape of being wide outside and being narrow inside in an inward direction, and a first end of the resistor unit is electrically coupled to an input signal; and a capacitor unit, comprising a first charge plate and a second charge plate disposed opposite to each other, wherein the first charge plate is electrically coupled to a second end of the resistor unit, and the second charge plate is electrically coupled to a grounding line, wherein the resistor unit and the capacitor unit are formed on the circuit board in a manner of conductive line configuration.

The technical problem of this application may be further resolved by taking the following technical measures.

In an embodiment of this application, the shape of being wide outside and being narrow inside comprises an hourglass shape or a shape of two connected triangles.

In an embodiment of this application, the first end of the resistor unit is configured in a fold line manner, a straight line manner, a curved line manner, or an oblique line manner, and the second end of the resistor unit is configured in a fold line manner, a straight line manner, a curved line manner, or an oblique line manner.

In an embodiment of this application, the first end is configured in a manner of equal line widths or different line widths, and the second end is configured in a manner of equal line widths or different line widths.

In an embodiment of this application, the first charge plate and the second charge plate are respectively disposed on different circuit board layers of the circuit board.

In an embodiment of this application, the first charge plate and the second charge plate are respectively disposed at positions, corresponding to each other, of two different surfaces of the circuit board.

In an embodiment of this application, the first charge plate and the second charge plate are circular, square, or polygonal.

Another objective of this application is a snubber circuit, disposed on a circuit board of a display apparatus, and comprising: a resistor unit, wherein two ends of the resistor unit are in a shape of being wide outside and being narrow inside in an inward direction, and a first end of the resistor unit is electrically coupled to an input signal; a capacitor unit, comprising a first charge plate and a second charge plate disposed opposite to each other, wherein the first charge plate is electrically coupled to a second end of the resistor unit, and the second charge plate is electrically coupled to a grounding line, wherein the circuit board is a multi-layer circuit board, the snubber circuit comprises the resistor unit and the capacitor unit, the two ends of the resistor unit are in the shape of being wide outside and being narrow inside in an inward direction, the first end and the second end of the resistor unit are continuously-curved lines, the first end of the resistor unit is electrically coupled to the input signal, the capacitor unit comprises the first charge plate and the second charge plate, the first charge plate and the second charge plate are disposed on different circuit board layers of the circuit board and at positions corresponding to each other, the first charge plate is electrically coupled to the second end of the resistor unit, and the second charge plate is electrically coupled to the grounding line; and the resistor unit and the capacitor unit are formed on the circuit board in a manner of conductive line configuration.

Still another objective of this application is a display apparatus, comprising: a display panel; a control module, configured to provide a control signal to control the display panel; a power supply module, configured to provide a power supply for operation of the control module and the display panel; a switch unit, configured to control connectivity between the power supply module and the control module and the display panel; and a snubber circuit, being a line connecting the switch unit, the control module, and the display panel, wherein the snubber circuit comprises a resistor unit and a capacitor unit, two ends of the resistor unit are in a shape of being wide outside and being narrow inside in an inward direction, and a first end of the resistor unit is electrically coupled to an input signal; the capacitor unit comprises a first charge plate and a second charge plate disposed opposite to each other, the first charge plate is electrically coupled to a second end of the resistor unit, and the second charge plate is electrically coupled to a grounding line; and the resistor unit and the capacitor unit are formed on the circuit board in a manner of conductive line configuration.

According to this application, the snubber circuit can be formed in the wiring manner while maintaining the original manufacturing process requirement and product costs without greatly changing the existing production flow, thereby reducing the manufacturing costs while maintaining the circuit effect. Because the production flow does not need to be adjusted, there are no special manufacturing process requirement and difficulty. Therefore, costs are not improved, and this application has extraordinary market competitiveness. In addition, the array wiring area does not need to be increased, and this application is applicable to a plurality of current display panel designs, and certainly, is also applicable to the design of a narrow bezel of a panel, and meets the market and technology trends.

DETAILED DESCRIPTION

The following embodiments are described with reference to the accompanying drawings, used to exemplify specific embodiments for implementation of this application. Terms about directions mentioned in this application, such as "on", "below", "front", "back", "left", "right", "in", "out", and "side surface" merely refer to directions in the accompanying drawings. Therefore, the used terms about directions are used, to describe and understand this application, and are not intended to limit this application.

The accompanying drawings and the description are considered to be essentially exemplary, rather than limitative. In the figures, modules with similar structures are represented by using the same reference number. In addition, for understanding and ease of description, the size and the thickness of each component shown in the accompanying drawings are arbitrarily shown, but this application is not limited thereto.

In the accompanying drawings, for clarity, thicknesses of a layer, a film a panel, an area, and the like are enlarged. In the accompanying drawings, for understanding and ease of description, thicknesses of some layers and areas are enlarged. It should be understood that when a component such as a layer, a film, an area, or a base is described to be "on" "another component", the component may be directly on the another component, or there may be an intermediate component.

In addition, throughout the specification, unless otherwise explicitly described to have an opposite meaning, the word "include" is understood as including the component, but not excluding any other component. In addition, throughout the specification, "on" means one being located above or below a target component and does not necessarily mean one being located on the top based on a gravity direction.

To further describe the technical measures taken in this application to achieve the application objective and effects thereof, specific implementations, structures, features, and effects of a snubber circuit and a display apparatus using same provided according to this application are described below in detail with reference to the drawings and preferred embodiments.

A display panel of this application may include a first substrate and a second substrate. The first substrate and the second substrate may be, for example, an active array switch (Thin Film Transistor, TFT) substrate and a color filter (CF) substrate. However, this application is not limited thereto. In some embodiments, an active array switch and a CF of this application may be formed on a same substrate.

In some embodiments, the display panel of this application may be, for example, a liquid crystal display panel. However, this application is not limited thereto. The display panel may alternatively be an OLED display panel, a W-OLED display panel, a QLED display panel, a plasma display panel, a curved-surface display panel, or a display panel of another type.

Figure 1A:
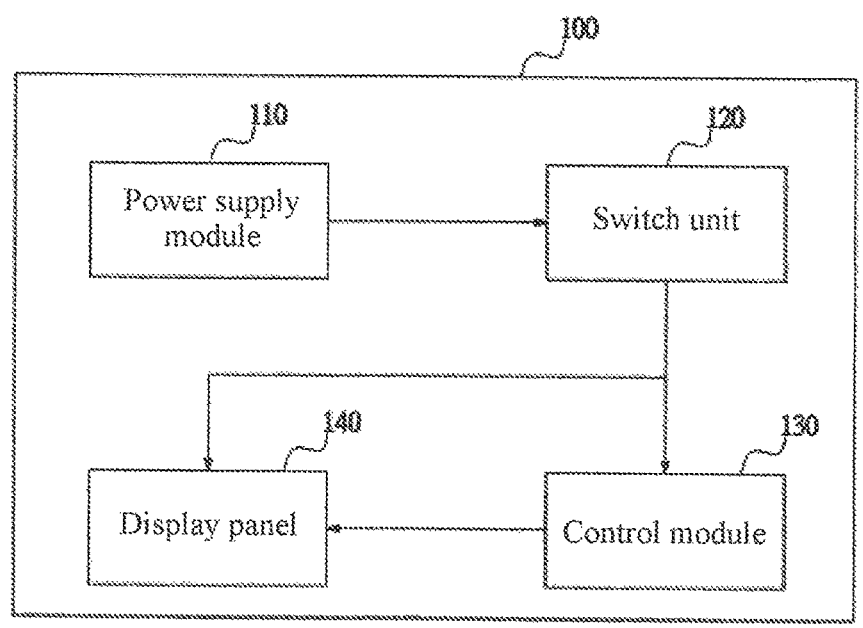
FIG. 1a is a schematic architectural diagram of an exemplary display apparatus.

FIG. 1a is a schematic architectural diagram of an exemplary display apparatus. Referring to FIG. 1a, a display apparatus 100 includes: a power supply module 110, a control module 130, a display panel 140, and a switch unit 120. The power supply module 110 provides a power supply for operation of the control module 130 and the display panel 140. The control module 130 provides a control signal to control operation of the display panel 140. The switch unit 120 may be disposed on the power supply module 110 to control on/off of the power supply module 110, or independently disposed on a power supply line between the power supply module 110 and the control module 130 and the display panel 140. The switch unit 120 is configured to control connectivity between the power supply module 110 and the control module 130 and the display panel 140.

Figure 1B:
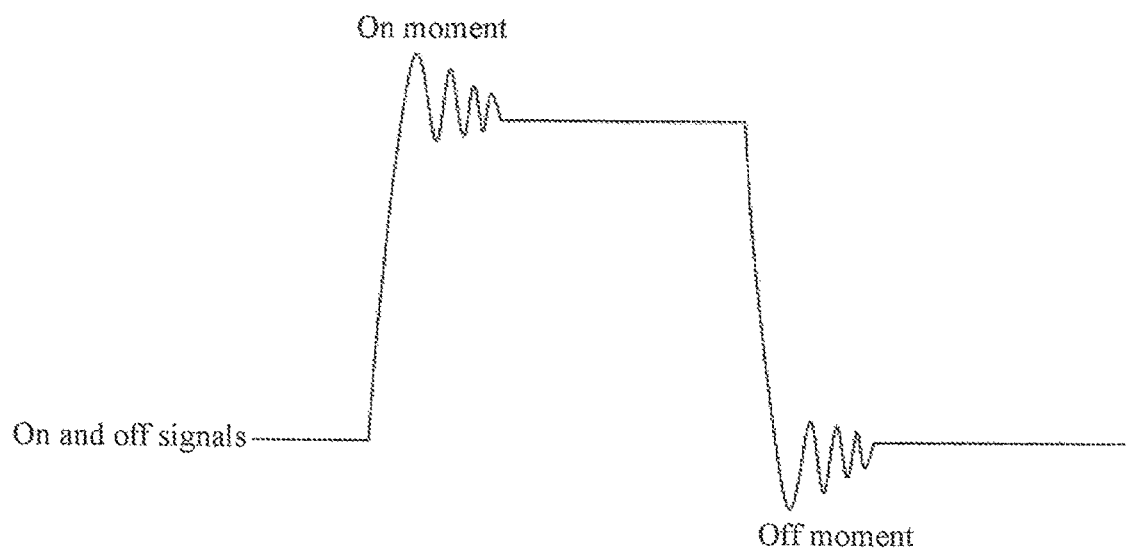
FIG. 1b is a schematic diagram of a waveform of a power supply signal during on and off of an exemplary display apparatus.

FIG. 1b is a schematic diagram of a waveform of a power supply signal during on and off of an exemplary display apparatus. Refer to FIG. 1a to facilitate understanding. As shown in FIG. 1b, when a switch unit 120 is "on" and "off", waveforms of on and off signals first oscillate before being gradually stable. Because the intrinsic property of the switch unit 120 is to frequently switch between "on" and "off", such an oscillation signal is constantly generated, and is finally radiated out by air. Therefore, the EMI brought by the oscillation signal is relatively severe.

Figure 1C:
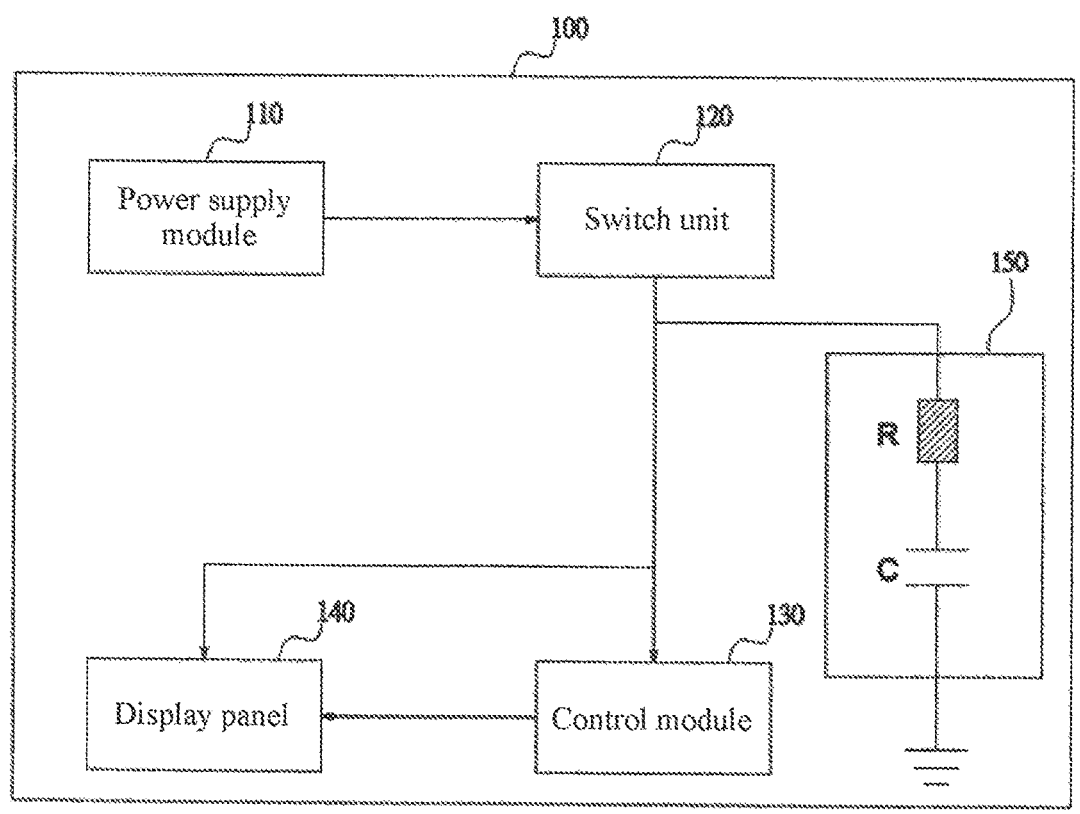
FIG. 1c is a schematic architectural diagram of an exemplary display apparatus in combination with a snubber circuit.
Figure 1D:
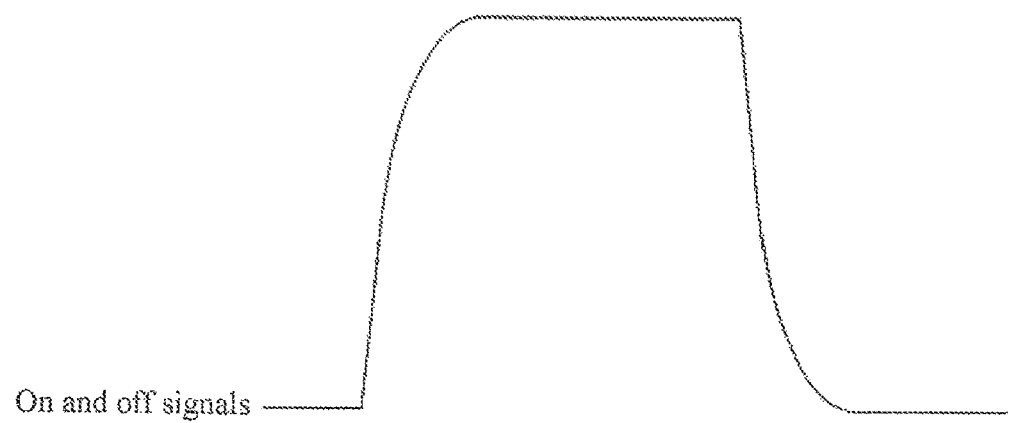
FIG. 1d is a schematic diagram of oscillation waveform elimination during on and off of an exemplary display apparatus.

FIG. 1c is a schematic architectural diagram of an exemplary display apparatus in combination with a snubber circuit, and FIG. 1d is a schematic diagram of oscillation waveform elimination during on and off of an exemplary display apparatus. Refer to FIG. 1a to facilitate understanding. A snubber circuit 150 connected to a switch unit 120 is disposed in the display apparatus 100. The snubber circuit 150 includes a resistor component R and a capacitor component C. Such an oscillation signal may be quickly eliminated by means of the damping effect of the resistor component R and the capacitor component C, to maintain stable signal waveforms, thereby greatly reducing the EMI. However, because the snubber circuit 150 implements only the function of eliminating transient waveform oscillation during "on" and "off" of a power switching module, in general, the resistance of the resistor component R is small, and the capacitance of the capacitor component C is also small. According to common practice, if the snubber circuit 150 is added, costs of part materials and circuit processing of the resistor component R and the capacitor component C are added. For low-cost applications, the competitiveness of products is relatively weakened.

Figure 2:
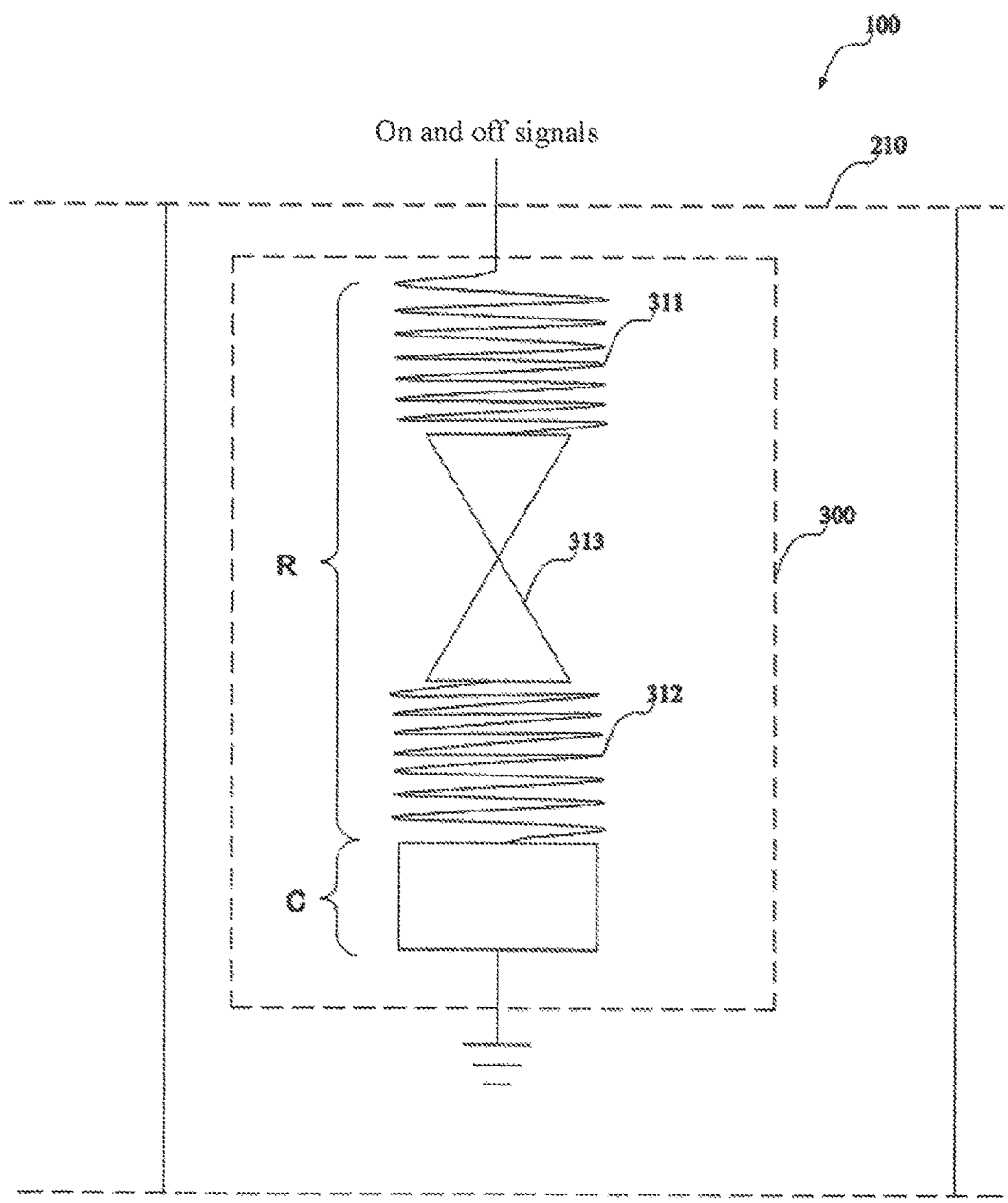
FIG. 2 is a schematic diagram of line configuration of an embodiment of a snubber circuit according to a method of the present application.
Figure 3:
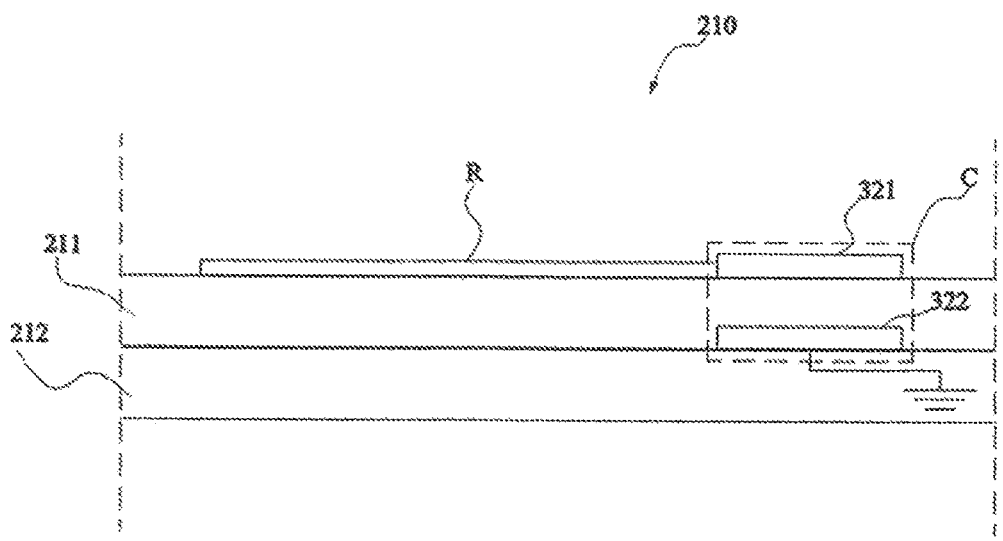
FIG. 3 is a schematic side view of lines of an embodiment of a snubber circuit according to a method of the present application.

FIG. 2 is a schematic diagram of line configuration of an embodiment of a snubber circuit according to a method of the present application, and FIG. 3 is a schematic side view of lines of an embodiment of a snubber circuit according to a method of the present application. Refer to FIG. 1a to FIG. 1c to facilitate understanding of the part of the related art. Referring to FIG. 2a, in an embodiment of this application, the snubber circuit 300 is disposed on a circuit board 210 of a display apparatus 100. The snubber circuit 300 includes: a resistor unit R, where two ends of the resistor unit R are in the shape of being wide outside and being narrow inside in the inward direction, and a first end 311 of the resistor unit R is electrically coupled to an input signal; a capacitor unit C, including a first charge plate 321 and a second charge plate 322 disposed opposite to each other, where the first charge plate 321 is electrically coupled to a second end 312 of the resistor unit R, and the second charge plate is electrically coupled to a grounding line. The resistor unit R and the capacitor unit C are formed on the circuit board 210 in a manner of conductive line configuration.

As shown in FIG. 2, because the resistance of the resistor component R and the capacitance of the capacitor component C of the snubber circuit are both small, the resistor component R and the capacitor component C may be directly disposed by means of wiring configuration or a circuit board wiring technology. The resistor component R includes the first end 311, a middle portion 313, and the second end 312. The first end 311 and the second end 312 of the resistor unit R are continuously-curved curves, to curve and lengthen wiring. Connection wiring in the shape of being wide outside and being narrow inside is disposed on the middle portion 313 of the resistor component R. The resistance is related to the wiring length, a larger length indicates a larger resistance, and meanwhile, the connection wiring in the shape of being wide outside and being narrow inside has a relatively large impedance. Therefore, the needed resistance is formed by using the two factors.

In some embodiments, the shape of being wide outside and being narrow inside, that is, the shape of the middle portion 313, includes an hourglass shape or a shape of two connected triangles.

In some embodiments, the first end 311 of the resistor unit R is configured in a fold line manner, a straight line manner, a curved line manner, or an oblique line manner.

In some embodiments, the second end 312 of the resistor unit R is configured in a fold line manner, a straight line manner, a curved line manner, or an oblique line manner.

In some embodiments, the first end 311 of the resistor unit R is configured in a manner of equal line widths or different line widths.

In some embodiments, the second end 312 of the resistor unit R is configured in a manner of equal line widths or different line widths.

As shown in FIG. 3, in an embodiment of this application, the first charge plate 321 and the second charge plate 322 of the capacitor component C are respectively disposed on different circuit board layers of the circuit board 210. In some embodiments, the first charge plate 321 is disposed on a first-layer plate 211, and the second charge plate 322 is disposed on a second-layer plate 212. A region covered by the first charge plate 321 basically overlaps with a region covered by the second charge plate 322. According to a parallel-plate capacitance formula $C=\varepsilon*S/D$, where $\varepsilon$ is a dielectric constant of a plate, is related to the material of a circuit board of a display panel, and is a fixed value, S is the overlapping area of parallel plates, and D is the distance between the parallel plates, by adjusting the overlapping area of the first charge plate 321 and the second charge plate 322, the adjusted capacitance of the capacitor component C can be obtained.

In some embodiments, the first charge plate 321 and the second charge plate 322 are respectively disposed at positions, corresponding to each other, of two different surfaces of a same circuit board layer in the display panel 200.

In some embodiments, the first charge plate 321 and the second charge plate 322 are circular, square, or polygonal.

In some embodiments, the input signal includes on and off signals of the display panel 200.

Figure 4:
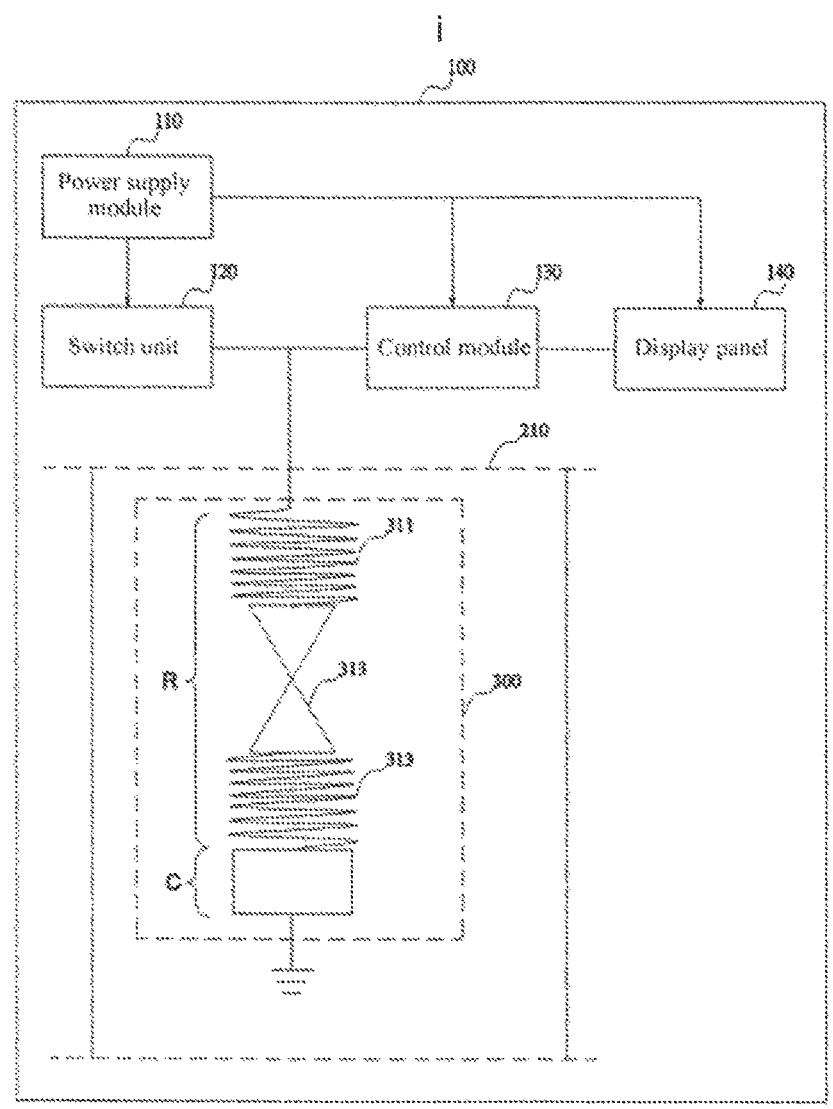
FIG. 4 is a schematic architectural diagram of an embodiment of a display apparatus according to a method of the present application.

FIG. 4 is a schematic architectural diagram of an embodiment of a display apparatus according to a method of the present application. Refer to FIG. 1a to FIG. 3 to facilitate understanding. In an embodiment of this application, a display apparatus 100 includes: a display panel 140; a control module 130, configured to provide a control signal to control the display panel 140; a power supply module 110, configured to provide a power supply for operation of the control module 130 and the display panel 140; a switch unit 120, configured to control the connectivity between the power supply module 110 and the control module 130 and the display panel 140; and a snubber circuit 300, being a line connecting the switch unit 120, the control module 130, and the display panel 140, where the snubber circuit 300 is disposed on a circuit board 210 of the display apparatus 100. The circuit board 210 is a multi-layer circuit board. The snubber circuit 300 includes a resistor unit R and a capacitor unit C. Two ends of the resistor unit R are in the shape of being wide outside and being narrow inside in the inward direction. A first end 311 and a second end 312 of the resistor unit R are continuously-curved lines. The first end 311 of the resistor unit R is electrically coupled to an input signal. The capacitor unit C includes a first charge plate 321 and a second charge plate 322. The first charge plate 321 and the second charge plate 322 are disposed on different circuit board layers of the circuit board 210 and at positions corresponding to each other. The first charge plate 321 is electrically coupled to the second end 312 of the resistor unit R, and the second charge plate 322 is electrically coupled to a grounding line GND. The resistor unit R and the capacitor unit C are formed on the circuit board 210 in a manner of conductive line configuration.

According to this application, the snubber circuit can be formed in the wiring manner while maintaining the original manufacturing process requirement and product costs without greatly changing the existing production flow, thereby reducing the manufacturing costs while maintaining the circuit effect. Because the production flow does not need to be adjusted, there are no special manufacturing process requirement and difficulty. Therefore, costs are not improved, and this application has extraordinary market competitiveness. In addition, the array wiring area does not need to be increased, and this application is applicable to a plurality of current display panel designs, and certainly, is also applicable to the design of a narrow bezel of a panel, and meets the market and technology trends.

The wordings such as "in some embodiments" and "in various embodiments" are repeatedly used. They usually do not refer to a same embodiment; but they may refer to a same embodiment. The words, such as "comprise", "have", and "include", are synonyms, unless other meanings are indicated in the context thereof.

The foregoing descriptions are merely specific embodiments of this and application, are not intended to limit this application in any form. Although this application has been disclosed above through the specific embodiments, the embodiments are not intended to limit this application. Any person skilled in the art can make some variations or modifications, namely, equivalent changes, according to the foregoing disclosed technical content to obtain equivalent embodiments without departing from the scope of the technical solutions of this application. Any simple amendment, equivalent change, or modification made to the foregoing embodiments according to the technical essence of this application without departing from the content of the technical solutions of this application shall fall within the scope of the technical solutions of this application.

What is claimed is:

1. A snubber circuit, disposed on a circuit board of a display apparatus, and comprising:
a resistor unit, wherein two ends of the resistor unit are in a shape of being wide outside and being narrow inside in an inward direction, and a first end of the resistor unit is electrically coupled to an input signal; and
a capacitor unit, comprising a first charge plate and a second charge plate disposed opposite to each other, wherein the first charge plate is electrically coupled to a second end of the resistor unit, and the second charge plate is electrically coupled to a grounding line, wherein
the resistor unit and the capacitor unit are formed on the circuit board in a manner of conductive line configuration;
wherein the first end of the resistor unit is configured in a fold line manner or a straight line manner or a curved line or an oblique line manner; and
wherein the second end of the resistor unit is configured in a fold line manner or a straight line manner or a curved line or an oblique line manner.

2. The snubber circuit according to claim 1, wherein the shape of being wide outside and being narrow inside comprises an hourglass shape.

3. The snubber circuit according to claim 1, wherein the shape of being wide outside and being narrow inside comprises a shape of two connected triangles.

4. The snubber circuit according to claim 1, wherein the first end is configured in a manner of equal line widths.

5. The snubber circuit according to claim 1, wherein the first end is configured in a manner of different line widths.

6. The snubber circuit according to claim 1, wherein the second end is configured in a manner of equal line widths.

7. The snubber circuit according to claim 1, wherein the second end is configured in a manner of different line widths.

8. The snubber circuit according to claim 1, wherein the first charge plate and the second charge plate are respectively disposed on different circuit board layers of the circuit board.

9. The snubber circuit according to claim 1, wherein the first charge plate and the second charge plate are respectively disposed at positions, corresponding to each other, of two different surfaces of the circuit board.

10. The snubber circuit according to claim 1, wherein the first charge plate and the second charge plate are circular.

11. The snubber circuit according to claim 1, wherein the first charge plate and the second charge plate are square.

12. The snubber circuit according to claim 1, wherein the first charge plate and the second charge plate are polygonal.

13. A snubber circuit, disposed on a circuit board of a display apparatus, and comprising:
a resistor unit, wherein two ends of the resistor unit are in a shape of being wide outside and being narrow inside in an inward direction, and a first end of the resistor unit is electrically coupled to an input signal;
a capacitor unit, comprising a first charge plate and a second charge plate disposed opposite to each other, wherein the first charge plate is electrically coupled to a second end of the resistor unit, and the second charge plate is electrically coupled to a grounding line, wherein
the circuit board is a multi-layer circuit board, the snubber circuit comprises the resistor unit and the capacitor unit, the two ends of the resistor unit are in the shape of being wide outside and being narrow inside in an inward direction, the first end and the second end of the resistor unit are continuously-curved lines, the first end of the resistor unit is electrically coupled to the input signal, the capacitor unit comprises the first charge plate and the second charge plate, the first charge plate and the second charge plate are disposed on different circuit board layers of the circuit board and at positions corresponding to each other, the first charge plate is electrically coupled to the second end of the resistor unit, and the second charge plate is electrically coupled to the grounding line; and
the resistor unit and the capacitor unit are formed on the circuit board in a manner of conductive line configuration;
wherein the first end of the resistor unit is configured in a fold line manner or a straight line manner or a curved line or an oblique line manner; and
wherein the second end of the resistor unit is configured in a fold line manner or a straight line manner or a curved line or an oblique line manner.

14. A display apparatus, comprising:
a display panel;
a control module, configured to provide a control signal to control the display panel;
a power supply module, configured to provide a power supply for operation of the control module and the display panel;
a switch unit, configured to control connectivity between the power supply module and the control module and the display panel; and
a snubber circuit, being a line connecting the switch unit, the control module, and the display panel, wherein
the snubber circuit comprises a resistor unit and a capacitor unit, two ends of the resistor unit are in a shape of being wide outside and being narrow inside in an inward direction, and a first end of the resistor unit is electrically coupled to an input signal; the capacitor unit comprises a first charge plate and a second charge plate disposed opposite to each other, the first charge plate is electrically coupled to a second end of the resistor unit, and the second charge plate is electrically coupled to a grounding line; and the resistor unit and the capacitor unit are formed on the circuit board in a manner of conductive line configuration;

wherein the first end of the resistor unit is configured in a fold line manner or a straight line manner or a curved line or an oblique line manner; and wherein the second end of the resistor unit is configured in a fold line manner or a straight line manner or a curved line or an oblique line manner.

* * * * *